US008892262B2

(12) United States Patent
Mullet et al.

(10) Patent No.: US 8,892,262 B2
(45) Date of Patent: Nov. 18, 2014

(54) PROGRAMMABLE WALL STATION FOR AUTOMATED WINDOW AND DOOR COVERINGS

(75) Inventors: Willis J. Mullet, Gulf Breeze, FL (US); Ben L. Garcia, Cumming, GA (US); Yan Rodriguez, Suwanee, GA (US); Jeffrey P. Hughes, Sugar Hill, GA (US); Matthew W. Kirkland, Cantonment, FL (US); Jonathan L. Watts, Pensacola, FL (US)

(73) Assignee: Qmotion Incorporated, Pensacola, FL (US)

( * ) Notice: Subject to any disclaimer, the term of this patent is extended or adjusted under 35 U.S.C. 154(b) by 394 days.

(21) Appl. No.: 13/231,390

(22) Filed: Sep. 13, 2011

(65) Prior Publication Data

US 2013/0067480 A1 Mar. 14, 2013

(51) Int. Cl.
*G01M 1/38* (2006.01)
*E06B 9/68* (2006.01)

(52) U.S. Cl.
CPC .......................................... *E06B 9/68* (2013.01)
USPC .................................................. 700/275; 160/5

(58) Field of Classification Search
USPC ........ 700/275, 278, 299, 284; 160/5; 318/452
See application file for complete search history.

(56) References Cited

U.S. PATENT DOCUMENTS

| | | | | |
|---|---|---|---|---|
| 5,598,000 | A | 1/1997 | Popat | 250/206 |
| 5,881,366 | A | 3/1999 | Bodenmann et al. | 455/66 |
| 6,231,482 | B1 * | 5/2001 | Thompson | 482/37 |
| 6,782,245 | B1 | 8/2004 | Lazzarotto et al. | 455/226.1 |
| 6,934,634 | B1 | 8/2005 | Ge | 702/2 |
| 6,965,581 | B2 | 11/2005 | Nguyen et al. | 370/316 |
| 7,479,949 | B2 | 1/2009 | Jobs et al. | 345/173 |
| 7,610,011 | B2 | 10/2009 | Albrett | 455/3.04 |
| 2003/0098133 | A1 | 5/2003 | Palmer | 160/310 |
| 2006/0174102 | A1 * | 8/2006 | Smith et al. | 713/150 |
| 2006/0207730 | A1 | 9/2006 | Berman et al. | 160/310 |
| 2007/0221338 | A1 * | 9/2007 | Meewis et al. | 160/7 |

(Continued)

FOREIGN PATENT DOCUMENTS

| | | | |
|---|---|---|---|
| EP | 1 069 277 | A2 | 1/2001 |
| FR | 2 803 621 | A1 | 7/2001 |
| WO | WO 2007/006775 | A1 | 1/2007 |

OTHER PUBLICATIONS

International Search Report from corresponding application No. PCT/US2012/051533 mailed Jan. 2, 2013.

(Continued)

*Primary Examiner* — Sean Shechtman
*Assistant Examiner* — Chad Rapp
(74) *Attorney, Agent, or Firm* — Renner Kenner Greive Bobak Taylor & Weber

(57) ABSTRACT

A programmable wall station system for controlling automated coverings includes at least one automated covering adapted to receive command signals, and a computer which includes a processor and a computer connection port. The processor is programmed to receive location input, position input for the automated coverings, schedule input, and generate scheduled events based on any of the received input. A wall station includes a controller and a station connection port that is linkable to the computer connection port. The controller is programmed to receive scheduled events from the processor when the station connection port and computer connection port are linked to one another and generate command signals based on the scheduled events for receipt by the automated covering to control its operation.

16 Claims, 10 Drawing Sheets

(56) References Cited

U.S. PATENT DOCUMENTS

| | | | | |
|---|---|---|---|---|
| 2008/0154437 | A1* | 6/2008 | Alexanian | 700/284 |
| 2010/0071856 | A1* | 3/2010 | Zaharchuk et al. | 160/5 |
| 2010/0325143 | A1 | 12/2010 | Straub et al. | 707/769 |

OTHER PUBLICATIONS

Written Opinion from corresponding application No. PCT/US2012/051533 mailed Jan. 2, 2013.

* cited by examiner

PROGRAMMABLE WALL STATION FOR AUTOMATED WINDOW AND DOOR COVERINGS

TECHNICAL FIELD

Generally, the present invention is directed to the control of automated window and door coverings. Specifically, the present invention is directed to programmable and portable wall station transmitters that automatically set positions of coverings based upon a time of day and/or a day of the week, and/or a geographic position, and/or other input.

BACKGROUND ART

Interior window coverings are primarily used to selectively block sunlight. The window coverings can also be used to help adjust heating and cooling of rooms as needed. In other words, during winter months the shades can be opened so as to let sunlight in and assist in heating the room. In summer months, the shades can be kept closed to block sunlight and assist in keeping the room temperature cool. The window coverings can also be used to adjust the amount of lighting within the room. Exterior window coverings can be used for the same purpose and also for storm protection and for aesthetic purposes. When houses or buildings are close to one another shades are used for privacy purposes.

In houses, apartments or other living accommodations with many windows, it is time consuming to manually adjust the position of each shade. Motorized controls are available for adjusting the position of the window shades, but these are usually only associated with a single window. Moreover, such motorized control still requires direct user input. Although an improvement in the art, such a system has at least two significant shortcomings. First, a series of shades cannot be controlled in unison. Secondly, no consideration is provided for the time of day as to whether the user would like for the shade to be fully open in the morning, partially closed in the afternoon, or what other scenario the user may desire. A further drawback of current systems is that there is no appreciation as to the time of year as it relates to the position of the sun which positionally varies throughout the year. Also there is no appreciation as to the geographical location of the housing or facility so as to accommodate sun position through the year. In other words, the sun position in southern Florida differs significantly from that in northeast Ohio.

Therefore, there is a need in the art to provide a simplified portable remote control that can be easily programmed to control any number of shades. And there is a need in the art to provide controls for the automated coverings that can adjust to different times of the year and different geographic locations as determined by the end user.

SUMMARY OF THE INVENTION

In light of the foregoing, it is a first aspect of the present invention to provide a programmable wall station for automated window and door coverings.

It is another aspect of the present invention to provide a programmable wall station system for controlling automated coverings, comprising at least one automated covering adapted to receive command signals, a computer including a processor and a computer connection port, the processor programmed to receive location input, receive position input for the at least one automated covering, receive schedule input, and generate scheduled events based on any of the received input, and a wall station including a controller and a station connection port that is linkable to the computer connection port, the controller programmed to receive scheduled events from the processor when the station connection port and the computer connection port are linked to one another, and generate command signals based on the scheduled events for receipt by the at least one automated covering to control operation thereof.

Yet another aspect of the present invention is to provide a method for controlling automated coverings, comprising inputting at least one of geographic location, covering position and an alarm into a computer processor, generating an event schedule from input into the computer processor, linking the computer processor to a wall station so as to load the event schedule into the wall station, and generating command signals by the wall station to control positioning of the at least one automated wall covering.

BRIEF DESCRIPTION OF THE DRAWINGS

This and other features and advantages of the present invention will become better understood with regard to the following description, appended claims, and accompanying drawings wherein:

BEST MODE FOR CARRYING OUT THE INVENTION

Figure 1:
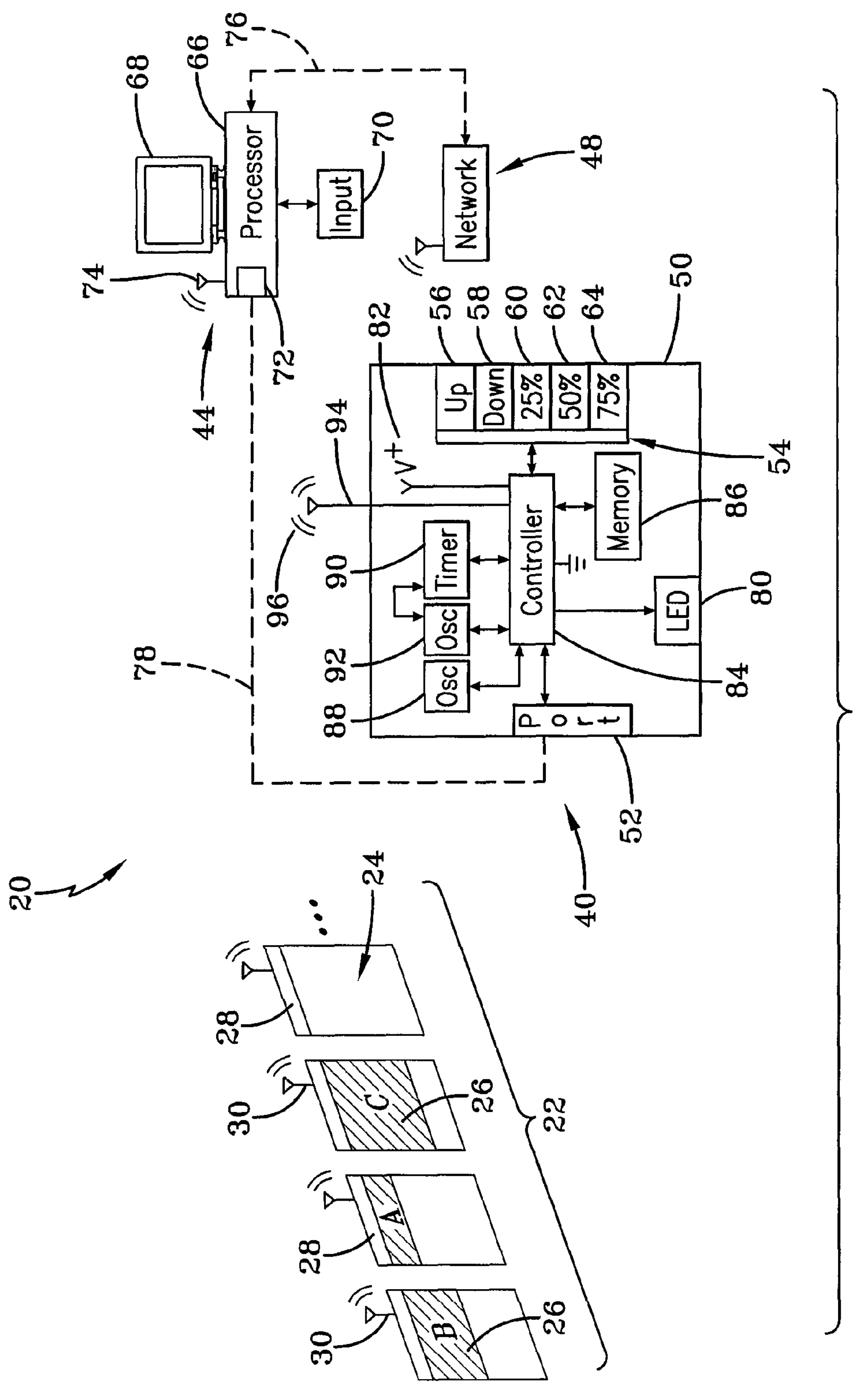
FIG. 1 is a schematic diagram of a programmable wall station system for controlling automated window and door coverings according to the concepts of the present invention.
Figure 2:
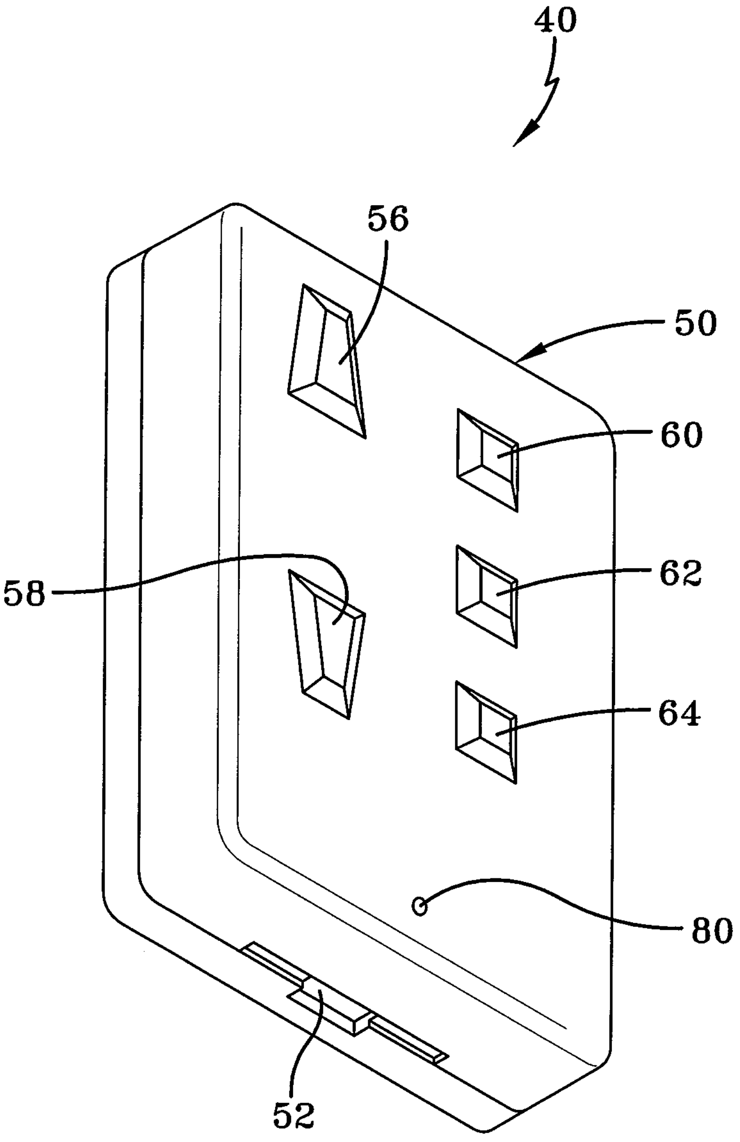
FIG. 2 is a perspective view of a programmable wall station utilized in accordance with the concepts of the present invention.

Referring now to the drawings and in particular to FIGS. 1 and 2, it can be seen that a programmable wall station system for controlling automated window and door coverings is designated generally by the numeral 20. Included in the system is at least one automated covering designated generally by the numeral 22. The covering 22 is typically a window shade but skilled artisans will appreciate that the covering includes any device that moves between open and close positions and to any position in between. The coverings 22 may be adjacent one another if multiple coverings are provided or they may be provided on different walls of a room or other enclosure. Each covering 22 is associated with an opening 24 which in most embodiments is a window. The covering incorporates a shade 26 also referred to as a cover or a covering device. Associated with each shade is a cover control 28 which provides for a motorized linkage that moves the shade 26 to a desired position. Each cover control 28 is provided with an antenna 30 that receives and sends wireless signals to initiate movement of a shade 26 and to control other related functions. Skilled artisans will appreciate that a movement or command signal received by the cover control 28 could also be from a wired connection.

A wall station, designated generally by the numeral 40, is used to control the position of the shades 26 with respect to their corresponding openings 24. As will be discussed in further detail, the wall station provides for button commands or scheduled events to be transmitted wirelessly in the movement or command signal to the cover controls to control operation of the shade 26.

A personal computer, designated generally by the numeral 44, is also part of the system 20. As will be discussed in detail, the computer is linkable to the wall station 40, wirelessly or by a wired connection, and is used for programming the wall station 40 so as to control operation of the shade or shades. A network device 48 may also be incorporated into the system 20 so as to control operation of the wall station 40.

As best seen in FIGS. 1 and 2, the wall station 40 includes a housing 50 which provides a connection port 52. The connection port 52 is a universal serial bus (USB) and in one embodiment the connection port 52 is a micro-USB type B receptacle. In other embodiments, other types of serial connectors may be used. The housing 50 is provided with a plurality of buttons designated generally by the numeral 54. The buttons can be laid out in an intuitive pattern such that an up button 56 and a down button 58 are provided in close proximity to one another and a plurality of intermediary buttons are provided in a somewhat spaced apart position. In particular, an intermediate button 60, an intermediate button 62, and an intermediate button 64 are provided. The button 60 is pre-programmed so as to send a command signal to move a designated shade or shades to a twenty-five percent closed position as seen with the shade 22 designated by the letter A. Likewise, button 62 is pre-programmed to move the shade or shades 22 to a fifty percent closed position as designated by the letter B, and button 64 is pre-programmed to move the shade or shades 22 to a seventy-five percent closed position as designated by the letter C. Skilled artisans will appreciate that the intermediate buttons 60, 62 and 64 may be pre-programmed to any intermediate position between full open and fully closed. Skilled artisans will also appreciate that the housing 50 is mounted in relatively close proximity to the automated coverings 22 so as to be within range of the wireless movement signals. The housing 50 is constructed so as to be detachable from a wall or other fixture for portable transfer to the computer 44. However, in some embodiments, the housing could be wirelessly linked to the personal computer 44.

The computer 44 includes a processor which contains the necessary hardware and software for implementing the embodiments of the present invention 20. As shown, the computer 44 may be a desktop computer, but other laptop, tablet, handheld or other computing devices could be used. In any event, the processor 66 is connected to a screen 68 which provides visual information to the user and also an input device 70 such as a keyboard or touch screen which allows for entry of events and timing considerations that are utilized by the wall station 40. The processor 66 is linked to a connection port 72 which is also of a universal USB type. The processor 66 may also provide a connection for an antenna device so as to allow for wireless transfer of data between the processor 66 and the wall station 40. In most embodiments, a wired link 76 is used to connect the processor 66 to a network device 48. In other embodiments the network device 48 is a Z-wave™ device or other home network device which wirelessly communicates with the processor 66 via the antenna 74. The network device 48 has its own antenna to allow for communication with the computer and/or the wall station.

Referring back to FIG. 1, the details of the wall station will now be discussed. The wall station may be linked to the processor 66 via a wired link 78. The link 78 interconnects the connection ports 72 and 52 so as to allow for direct communication between the wall station 40 and the processor 66. The wall station includes a light emitting diode 80 or other illumination type device so as to provide for a positive indication to the user that transmissions are occurring between the wall station 40 and the window coverings 22 and/or the processor 66. A power source 82 is provided by the wall station and it may be in the form or a lithium-type coin cell battery or equivalent. Solar power or other power sources could also be used for the power source 82.

A controller 84 is maintained by the wall station 40 and provides the necessary hardware, software and internal memory components to allow for operation of the wall station as part of the system 20. A memory device 86 is connected to the controller 84 and may be in the form of an EEPROM device which stores, among other things, an identification serial number and program/event schedules for operation of the system. A controller oscillator 88 is connected to the controller 84 and provides a timing or clock signal primarily used by the controller when transmitting radio frequency or other type signals to the automated shade covering 22. An external timer 90 is also connected to the controller 84 and is maintained separately therefrom so as to reduce the overall power consumption of the station 40. In other words, utilization of the timer 90 lets the controller 84 sleep when no activity or events are needed for transmission of the radio frequency or wireless signals to the coverings 22. A timer oscillator 92 is connected to both the external timer 90 and the controller 84. The timer oscillator 92 allows for operation of the controller 84 in a reduced power state so as to minimize battery drain.

An antenna 94 is connected to the controller 84 and used to send movement signals to the automated shade coverings 22. In the present embodiment, the frequency of operation is 433.92 MHz plus or minus KHz. The controller in one embodiment is a microchip PIC18LF14K50 device connected to a transmitter such as maxim MAX1472. The controller and the transmitter operate at an RF center frequency but utilize a crystal oscillator and a phase lock loop. It is estimated that the wall station's data transmission range is 75 feet at a minimum in open air.

Generally, in operation a user programs or schedules events utilizing the processor 66. In other words, a user inputs instructions into the computer which sets the dates and times the user wants the shade positions to move from one position to any other position at a predetermined period of time. As such, an "event" is any time a shade or shades are schedule to be moved from one position to another or when the system receives direct user input at the buttons 54 to move the shades from one position to another. The user may also input geographic information such as their postal code or GPS location and, based upon this information, the processor sets a scheduled time for opening and closing the shades to coordinate with sunrise and sunset, or other events. Accordingly, shades can be opened during the daytime and closed at nighttime based upon sunrise and sunset at a particular geographic position. Skilled artisans will appreciate that the portable wall station transmits a simple radio frequency data format having a unique identifying address stored in permanent memory and that it is powered by the battery. It will further be appreciated that the wall station is learned to the various automated coverings such that the wall station may control a single covering or multiple coverings as determined by the end user. The user is able to schedule events with the computer through the USB connection ports so as to set a current time and date on the wall station transmitter as well as set up at least two or more operating schedules where each schedule can activate at least one of the buttons. In other words, if for some reason the user would like to set all shades at fifty percent closed, at a particular time, the processor 66 can facilitate such a desire. It will further be appreciated that the wall station can allow the user to change the event timer with the computer through a wireless connection that is able to set the current time and date on the portable wall station as well schedule at least two operating schedules wherein each schedule can activate at least one of the buttons.

Referring now to FIGS. 3-10, a number of flow charts are presented which show operation of the wall station transmitter in conjunction with the automated coverings and the computer 44. All of the operational features described are implemented by the interaction between the wall station controller 84 and the computer processor 66. As will become apparent, the user inputs specific details of shade operation into the processor 66 which determines implementation of schedules to move the shade(s) as desired. Only the specific implementation movement signals are maintained by the wall station which still provides the user the ability to control a shade's specific position if desired.

Figure 3:
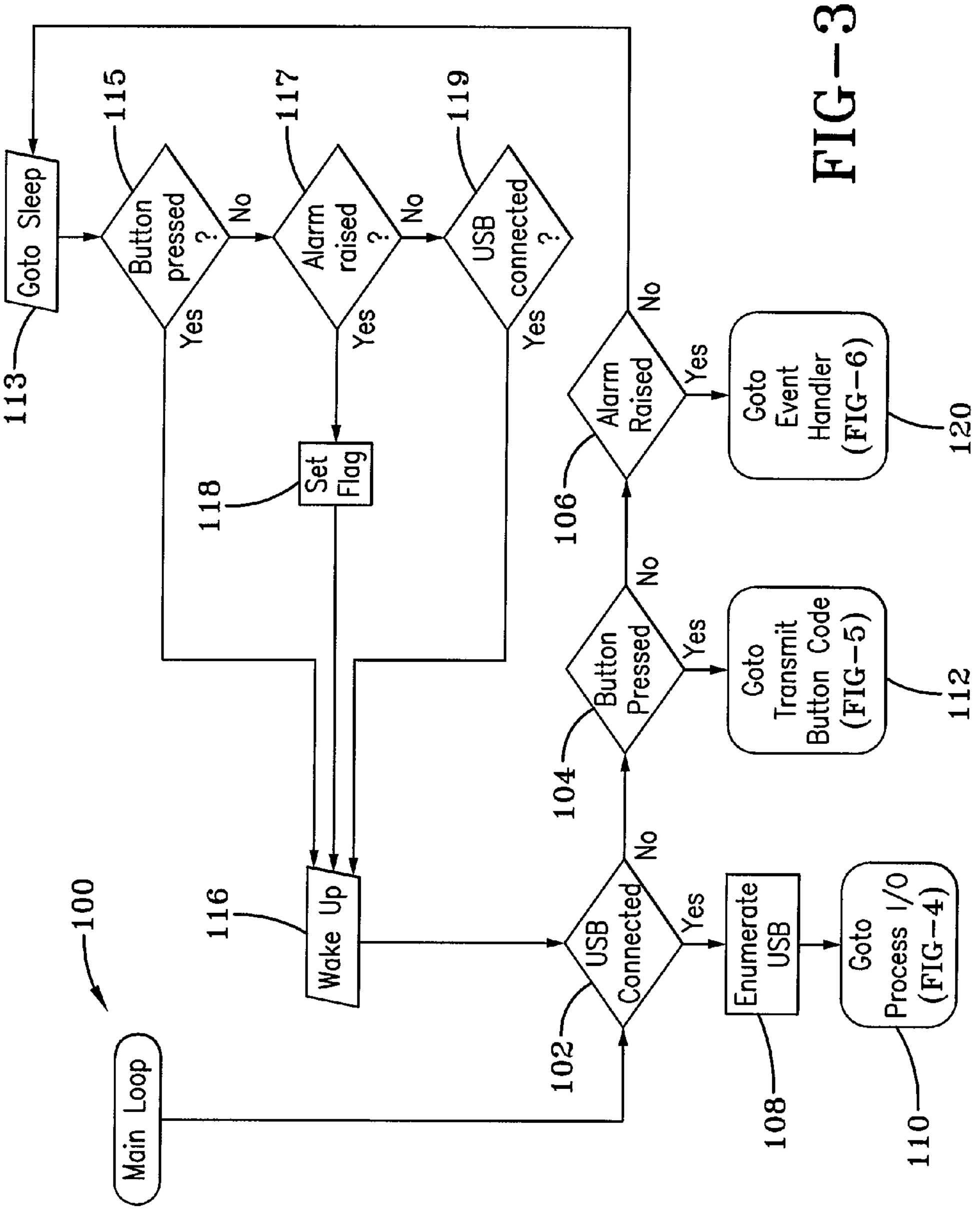
FIG. 3 is a main operational flow chart showing the operational steps of the programmable wall station system according to the concepts of the present invention.

In FIG. 3, a main operational loop is designated generally by the numeral 100. At step 102 it is first determined whether the wall station is connected to the computer or not. If not, then the loop 100 next determines whether a button on the wall station 40 has been pressed or not. If no buttons have been pressed, then the process moves on to step 106 to determine whether an alarm has been raised or not.

Returning to step 102, if it is determined that the connection ports are linked to one another, then at step 108 the USB is enumerated. In other words, the connection between the wall station and the personal computer are initialized to one another and ready to operate. The process then proceeds to step 110, which is further discussed in regard to the flow chart shown in FIG. 4.

Figure 5:
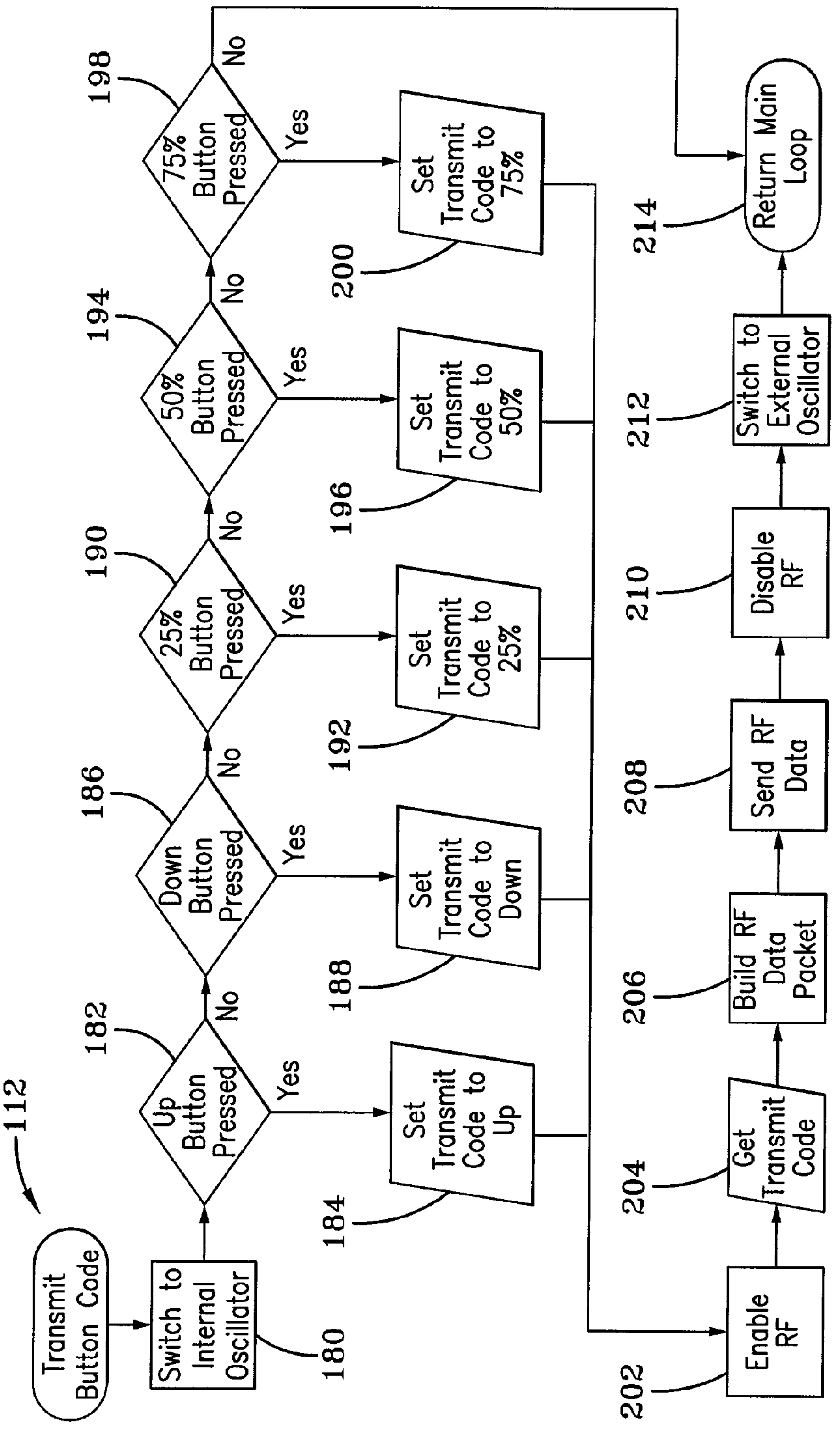
FIG. 5 is a transmit button code flow chart used in operation of the programmable wall station.

Returning to step 104, if it is determined that one of the buttons has been pressed on the wall station, then the process proceeds to step 112 which is the go to transmit button code process which refers to the flow chart shown in FIG. 5.

Returning to step 106, if it is determined that an alarm has been raised, wherein the setting of alarms will be discussed, then the process proceeds to step 120 which is further discussed in relation to FIG. 6. Upon completion of the event handler sub-routine at step 120, the process continues to step 121 where the last transmitted code is saved and a watchdog timer is enabled for a predetermined period of time such as thirty seconds or more. Of course, any time period could be used. The process then continues to step 122 to determine whether the watchdog timer woke up the controller 84. If so, the saved last transmitted code is re-transmitted at step 123 and the process returns to the sleep step 113. The re-transmission step is done so as to ensure that all coverings receive the transmitted signal. In some instances, the transmitted signal lacks sufficient strength to reach all the coverings or is subject to interference. Re-transmission ensures that the signals are received by the coverings and they are moved to the proper position. In any event, if the timer at step 122 did not wake the controller, then the process returns to the sleep step 113 and the wall station enters a sleep mode so as to conserve battery power. During the sleep mode, the controller periodically goes through a series of steps until a change in operation is detected. First, at step 115 the controller checks to see whether a button press from the wall station 40 has occurred or not. If so, then the controller awakens at step 116 and the process continues to step 102. If a button press is not detected then, the controller at step 117, determines whether an alarm has been raised or not. If so, then an alarm flag is set at step 118, the controller awakens at step 116 and the process continues to step 102. If an alarm is not raised, then the controller at step 119 ascertains whether a valid connection has been made to the USB port 52 or not. If so, then the controller awakens at step 116 and the process continues to step 102. If no connection is detected, the process returns to step 115 to repeat the above steps.

Figure 4:
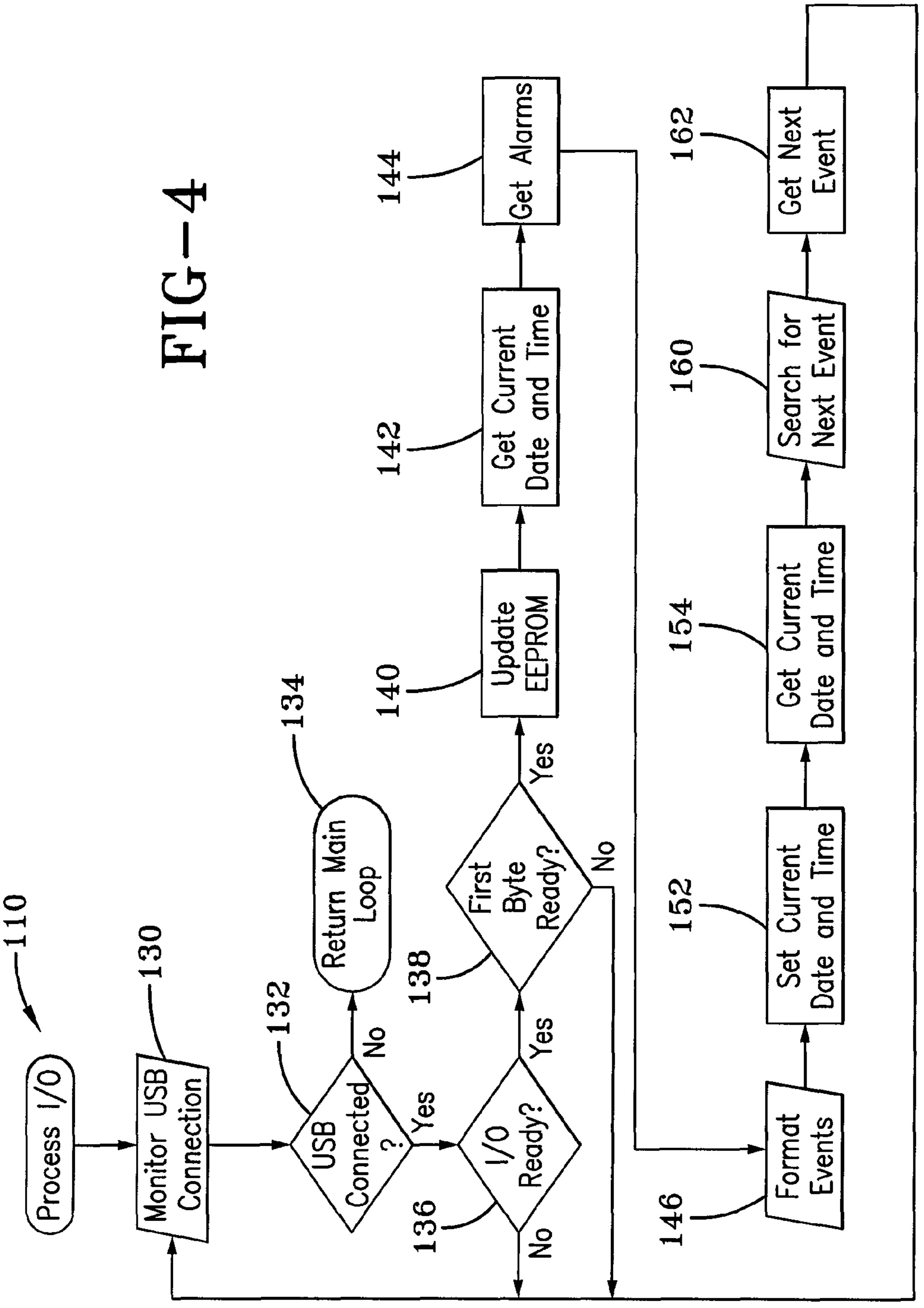
FIG. 4 is a process input/output flow chart used in operation of the programmable wall station.

Referring now to FIG. 4, the INPUT/OUTPUT (IO) process is designated generally by the numeral 110 and generally provides for exchanging data between the processor 66 and the controller 84. At step 130 the wall station initiates a monitoring routine whereupon at step 132 the controller determines whether the USB port is connected to the computer processor or not. If the USB is not connected, then the process returns to the main loop at step 134. However, if it is determined at step 132 that the USB port 52 is connected to the port 72, then at step 136 an IO routine maintained by the processor is checked to determine whether it is ready or not. If not ready, then the process returns to step 130. If, however, the IO process is ready, then at step 138 the validity of a first byte of the data transmitted from the computer processor 66 is checked. If not valid, then the process returns to the USB monitoring step 130. However, if the first byte is determined to be valid, then the memory device 86 connected to the controller 84 is updated at step 140. Next, at step 142, the current date and time are provided by the processor 66 to the wall station controller 84. Next, alarms are obtained by the controller 84 at step 144. These alarms are set by the personal computer depending upon the schedules and other information entered by the user. Next, at step 146, the events are formatted. This step is done so as to schedule which actions—moving shades to a desired position—are to occur at the alarm times designated at step 144. The current date and time of the timer 90 are then set at step 152 by the controller 84 to match the same information previously provided by the processor 66. Next, at step 160, the controller 84 searches for the next event provided in the connection between the processor and the controller and at step 162 the next event is obtained.

Referring now to FIG. 5, the transmit button code flow chart 112 will be described. These process steps are initiated whenever the user actuates one of the buttons 56, 58, 60, 62 or 64 as shown in the main loop (FIG. 3) step 104. Initially, the controller 84 is switched to operate using the controller oscillator 88 at step 180. This is done in view of the need to generate radio frequency data and send the data as will be described. The controller oscillator 88 and the controller 84 are utilized to get the correct timing while transmitting. In any event, at step 182 the controller 84 determines whether the up button 56 has been pressed or not. If so, then the transmit code is set to "up" at step 184. As will be appreciated, setting of a transmit code entails associating an easily configured binary or other value with a particular button function (up, down, etc.) and including that value in transmission of movement signals from the wall station 40 to any one of the coverings 22. In any event, if the up button has not been pressed at step 182, the process continues to step 186 to determine whether the down button 58 has been pressed. If so, then at step 188 the transmit code is set to down. If at step 186 the down button has not been pressed, then the process inquires as to whether the twenty five percent button has been pressed at step 190. If so, then at step 192 the transmit code is set to twenty five percent.

If at step 190 the button has not been pressed, the process inquires as to whether the fifty percent button has been pressed or not. If so, then the set transmit code is set to fifty percent at step 196. If not, then at step 198 the process inquires as to whether the seventy five percent button has been pressed or not. If so, then the transmit code button is set to seventy five percent. If for some reason it is determined that the seventy five percent button has not been pressed, then the process returns to the main loop (FIG. 3) at step 214. However, once one of the various transmit codes is set at step 184, 188, 192, 196 or 200, then the process continues to step 202 where the RF system is enabled by the controller 84. Next, at step 204, the "set" transmit code is obtained. At step 206 the RF data packet which includes the transmit code and any other identifying information is built by the controller and at step 208 the RF data packet is sent from the wall station to the automated covering 22. During this step, the packet is sent for the maximum time allowed by the FCC. Upon completion of the send instructions emitted by the antenna 94, the controller, at step 210, disables the radio frequency emitter. Upon completion of step 210, the controller at step 212 switches to the external timer oscillator 92 so as to reduce power consumption. Upon completion of this step, the process returns to the main loop at step 214.

Figure 6:
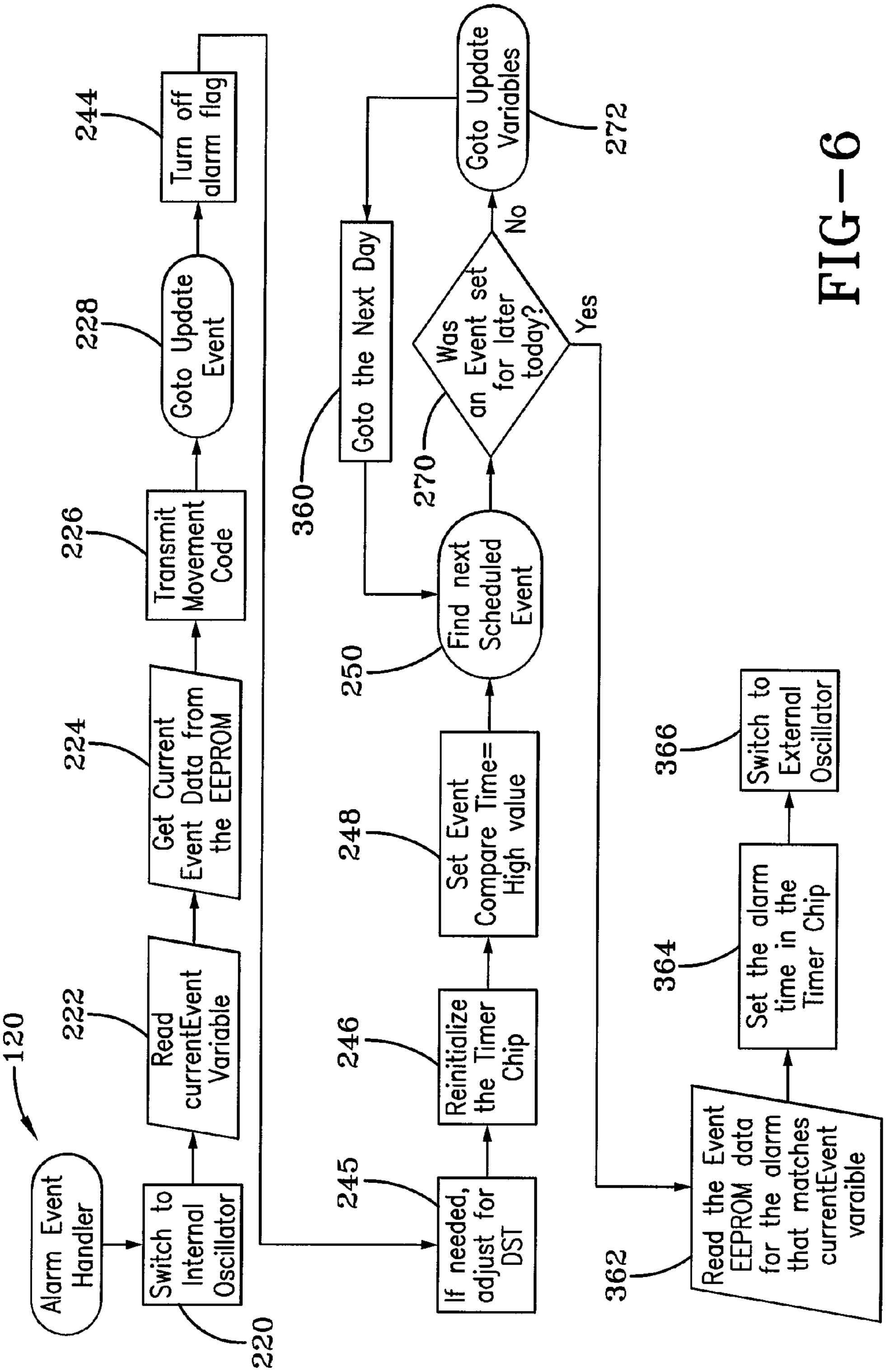
FIG. 6 is an event handler flow chart used in operation of the programmable wall station.

Briefly, referring back to the main loop (FIG. 3), the next step to be reviewed is when the alarm is raised at step 106 which instructs the controller to go to the alarm/event handler process step 120 which is shown in FIG. 6. In FIG. 6, it can be seen that the event handler 120 switches to the internal controller oscillator 88 at step 220 so as to provide the correct timing while transmitting. At step 222 a current event variable is read wherein the current event variable is what will occur when the last alarm set goes off. At step 224 the current event data from the memory device 86 is obtained. Next at step 226 a movement code is transmitted. Next at step 228, the process goes to an update event process or sub-routine which is shown and described in FIG. 7. Upon completion of the update event process in FIG. 7, the process discussion will return to FIG. 6.

Figure 7:
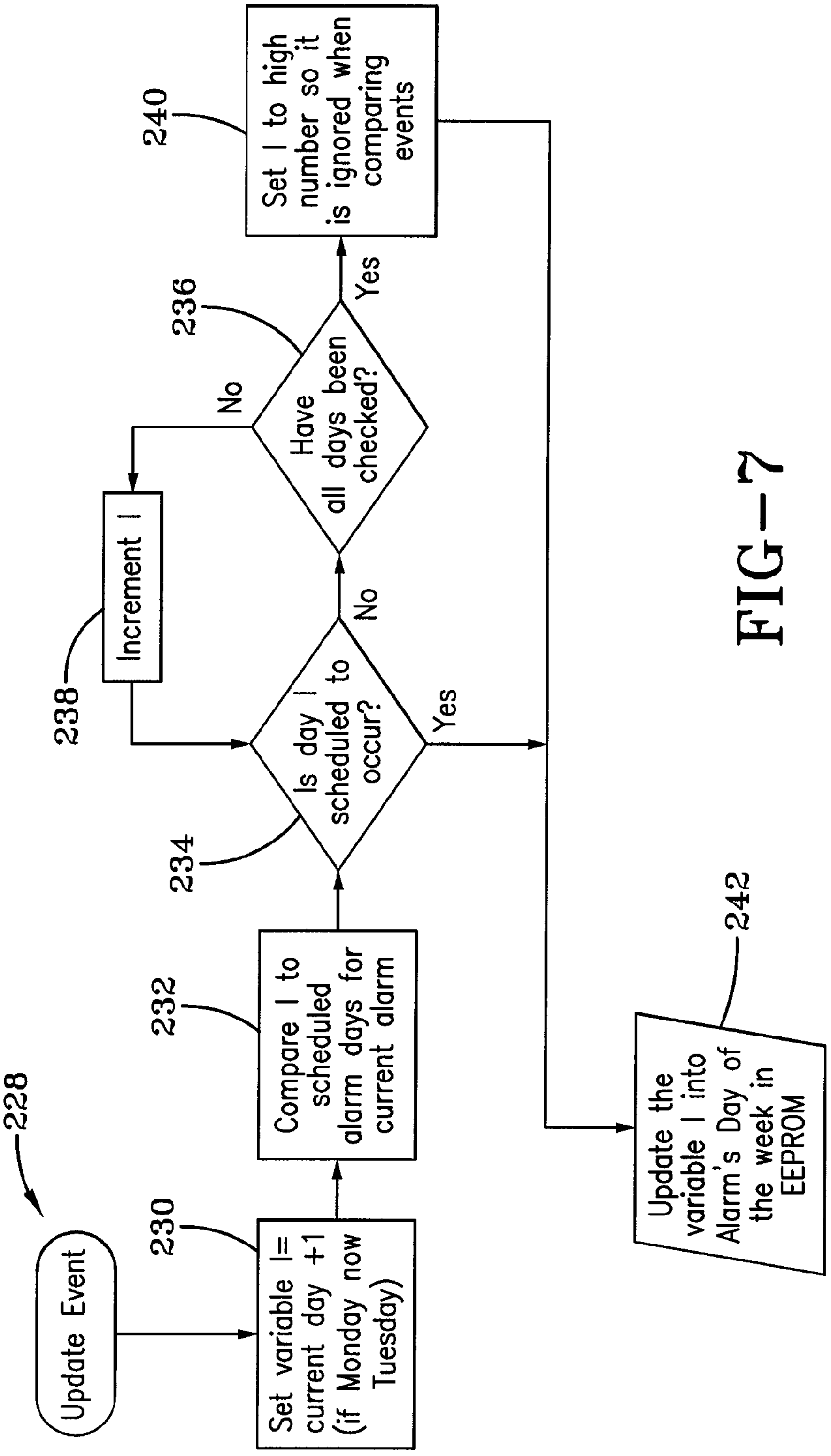
FIG. 7 is an update event flow chart used in operation of the programmable wall station.

Referring now to FIG. 7, the update event process 228 includes a step 230 which sets a variable I equal to the current day plus one. In other words, if the current day variable is Monday, the variable will be updated to Tuesday and so on. Next at step 232, the variable value I is compared to the scheduled alarm days for the current alarm, wherein the current alarm refers to the next scheduled movement of the covering. At step 234, the controller inquires as to whether an event or alarm on the day designated is scheduled to occur or not. If not, then the controller inquires as to whether all of the days have been checked at step 236. If not, then at step 238 the variable I is incremented and the process returns to step 234. After all the days have been checked at step 236 the process at step 240 sets the variable I to a high number so that it is ignored when comparing events. However, if at step 234 the alarm or event is scheduled to occur, the process goes to step 242 where the variable I is updated into the alarm's day of the week in the memory device 86. This step is also taken upon completion of step 240. Upon completion of the update event routine 228 the process returns to the alarm/event handler process 120 shown in FIG. 6.

Referring back to FIG. 6, upon completion of step 228, the process continues on at step 244 where an alarm flag, which was turned on at step 118, is turned off. At step 245, the process determines whether an adjustment needs to be made to the timer for Daylight Savings Time. This is done by checking the month and day of year and either adding or subtracting an hour from the timer chip as appropriate. Next, at step 246 the timer 90 is allowed to initialize and the event compare time is set to a high value. Next at step 250, the next scheduled event is located. This is a sub-routine that is shown and described in FIG. 8. Upon completion of the next scheduled event process in FIG. 8, the process discussion will return to FIG. 6.

Figure 8:
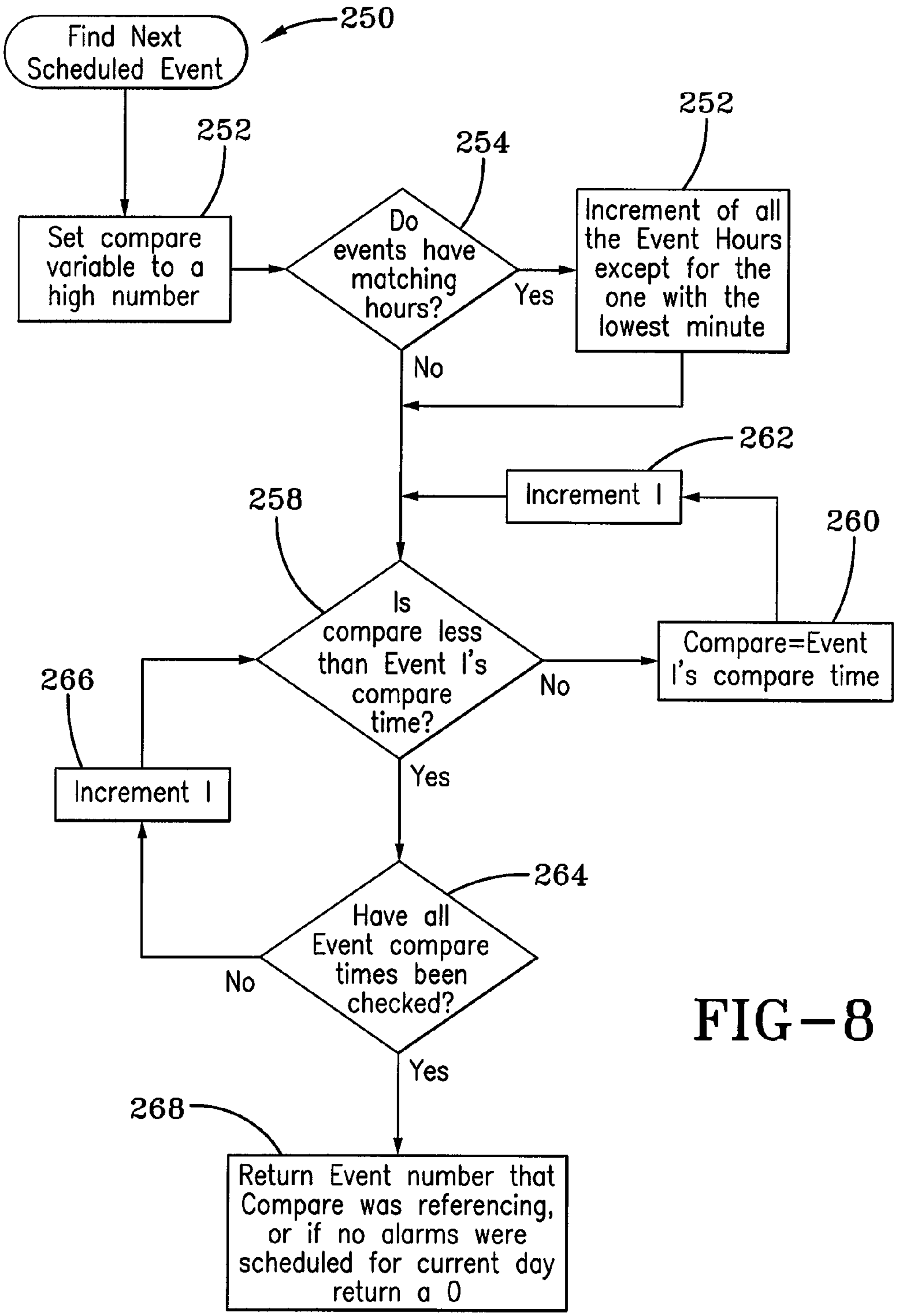
FIG. 8 is a find next scheduled event flow chart used in operation of the programmable wall station.

Referring now to FIG. 8, the find next scheduled event sub-routine 250 is shown and described below. At step 252, a compare variable is set to a high number so as to ensure that all upcoming events scheduled for the day are found and properly scheduled. Next at step 254 it is determined whether the scheduled events have matching hours, as established by the timer 90, or not. If so, then at step 256 all of the event hours are incremented by one except for the event with the lowest minute. Upon completion of step 256, or if the event matching hour is not matched at step 254, the process proceeds to step 258 where it is determined whether the compare variable value is less than the event I's compare time. If not, then at step 260 the variable compare is set equal to the event I's compare time and then incremented by one at the value i at step 262. Returning to step, 258, if the compare value is less than the event I's compare time then at step 264 the process inquires as to whether all event compare times have been checked or not. If not, then the process at step 262 increments the I value again by one and the process returns to step 258. However, if at step 264 it is determined that all the event compare times have been checked, then at step 268 a return event number that the compare value was referencing is returned or if no alarms were scheduled for that current day, a zero value is returned for the event number. A return event number refers to any number of "events" that can be scheduled for any given day, but which do not include direct user actuation of the buttons 54. In one embodiment, the maximum number of events is six, although any number could be used. Accordingly, the process returns to step 270 as shown and described in FIG. 6. At step 270 if an event was not scheduled for later that day, then the process continues to step 272 and the update time variables process or sub-routine is accessed. This process is shown in FIG. 9.

Figure 9:
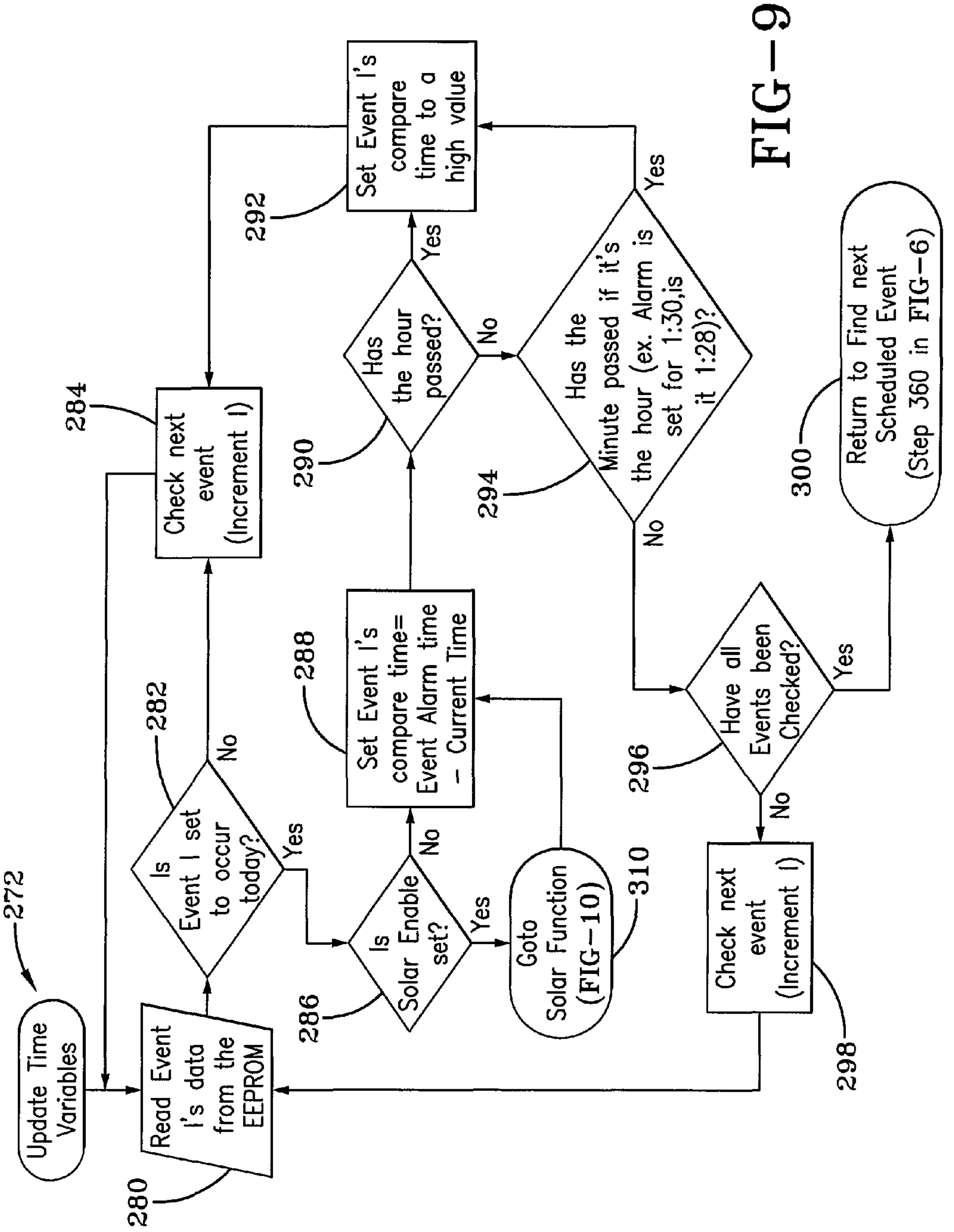
FIG. 9 is an update time variables flow chart used in operation of the programmable wall station.

Referring now to FIG. 9, the update time variables flow chart is designated generally by the numeral 272. At the first step, the memory device 86 is read to determine the event I's data. Next, at step 282 the controller inquires as to whether a scheduled event is set to occur. If not, then at step 284 the process checks for the next event, increments the i value, and returns to step 280. If at step 282 an event i is scheduled to occur for that particular day, then the process proceeds to step 286 to determine whether a solar enable flag has been set or not (the solar enable feature will be discussed in FIG. 10). If at step 286 it is determined that the solar enable feature has been set, then the process goes to the solar function which is shown and described in FIG. 10. It will be appreciated that the solar enable flag is set by the user at the processor of the computer and this is typically triggered by the input of a geographical location such as a postal code or GPS coordinate. If the solar enable has not been set, then the controller 84 sets the event I compare time to the event alarm time minus the current time. Upon completion of that step, the controller inquires as to whether the hour has passed at step 290. If the hour has passed, then at step 292 the event I's compare time is set to a high value and the process returns to step 284. However, if the hour has passed, then the controller inquires at step 294 whether the minute of the upcoming event has passed or not. If so, the process returns to step 292. If not, then at step 294 the controller inquires at step 296 as to whether all the events have been checked or not. If not, then the next event variable is incremented at step 298 and the process returns to step 280. However, if all events have been checked at step 296, then the process returns to FIG. 6 and the Go to the Next Day step 360.

Figure 10:
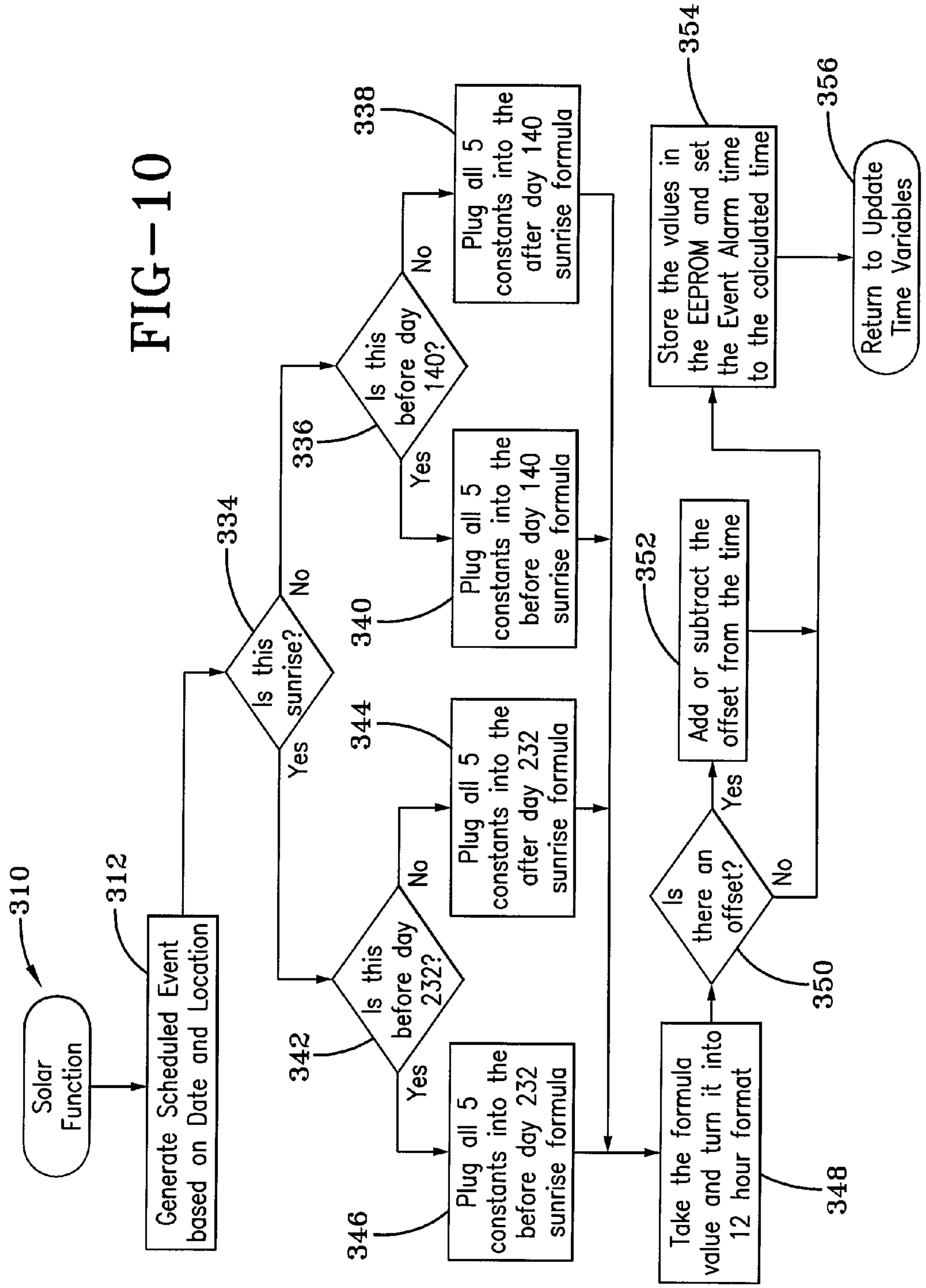
FIG. 10 is a solar function process flow chart used in operation of the programmable wall station.

Referring now to FIG. 10, the solar function process is designated generally by the numeral 310. Step 312 implements an algorithm to generate a scheduled event based on the time of year and the geographic location of the automated coverings 22. In particular, in step 312 the controller 84 reads precision solar constants from the memory 86 and, as described below, these constants are used to calculate a time for opening and closing the shades. The solar constants are derived so as to best approximate the sun's position given the time of year and the user's geographic position.

Next at step 334, the process determines whether, based on the calculations completed at step 332; a sunrise event is occurring or not. If a sunrise event is not occurring then the process proceeds to the next steps 336 or 342 to determine whether the day of the year is before day 140 or day 232. As skilled artisans will appreciate, day 140 and day 232 are fixed constants that allow curve fitting of simpler equations to the varying changes in sunrise/sunset times which are determined from an inverse hyperbolic tangent function. If it is not before day 140, then at step 338 all five constants calculated at step 332 are plugged into the after day 140 sunset formula. However, if at step 336 it is determined that the day of the year is before day 140 then all five constants are plugged into the before day 140 sunset formula.

If at step 334 it is determined that a sunrise is occurring, then the process continues to step 342 where it is determined whether the day is before or after day 232 of the year. In the event that it is not before day 232, then the process continues to step 344 where the five constants are plugged into the after day 232 sunrise formula. However, if at step 342 it is determined that the day of the year is before day 332, then the five constants are plugged into the before day 232 sunrise formula at step 346. Upon completion of steps 338, 340, 344 and 346 the constants are utilized and the formula value is turned into a twelve hour format at step 348. If desired, a user can incorporate an offset time, such as +/−90 minutes, into the sunrise/sunset event so as to adjust operation of how the system handles a sunrise/sunset event. If there is an offset that has been input by the user as detected at step 350, then at step 352 the offset is added or subtracted from the time. However, if there is not an offset at 350, or upon completion of step 352, the values are stored in the memory 86 and the event alarm is set to the calculated time at step 354. Upon completion of this step the process returns to the update time variables process at step 356.

Upon completion of the solar function, as seen in FIG. 9, the process returns to step 288 and the flow chart proceeds as indicated in the update time variables flow chart. Accordingly, upon completion of the update time variables step 272 the process continues to the next day so as to find the next scheduled event at step 250 as shown in FIG. 6. Once it is determined that an event is set for later that day at step 270, the process continues to step 362 where the event is read from the memory 86 for an alarm that matches the current event variable. At step 364 the alarm time is set in the timer 90. Upon completion of step 364, the process continues to step 366 where the external timer oscillator 92 is utilized and the internal controller oscillator 88 is turned off. Upon completion of step 366 the process returns to FIG. 3 which is the main loop process.

Based on the foregoing the advantages of the system 20 are readily apparent. Primarily, the present invention is advantageous in that it allows for all of the time event programming to be done at a personal computer or other computing device and automatically transferred to the hand held device upon linking or connection of the two. This simplifies the programming requirements such that they are not maintained in the portable device which purposely has comparatively limited computing power and, as such, is difficult to program. Instead, the user simply inputs the scheduled time information and the geographic information if appropriate into the computer 44 and/or network device 48. Accordingly, by linking the personal computer to the portable device all the needed scheduled events, alarms and related information are transferred. The portable device is then positioned in close proximity to the automated coverings and operates according to the scheduled events until such time that it is re-programmed. Skilled artisans will appreciate that the computer processor is programmed to receive a location input such as a postal identifier or zip code, or GPS coordinate or location information. The processor is also programmed to receive position input for the automated coverings. In other words, the user can input the percentage close position of each automated covering controlled by the wall station device. The processor is also programmed to generate scheduled events, such as at what time the shades are to be moved to the desired position. It will be appreciated that any number of scheduled events can be generated based upon the location input, the position input and/or the schedule input. The invention is further advantageous in that the wall station includes a controller that is adapted to be linked to the computer such that the controller is programmed to receive the scheduled events from the processor when the connection port and the computer connection port are linked to one another. From this information the wall station controller can generate command or movement signals based on the scheduled events for receipt by the automated coverings to control operation thereof. The input of the geographic location information allows for the wall station to adjust the opening and closing of the covering devices based upon the geographic location and the day of the year. As such, it will be appreciated that the coverings can be controlled so as to have minimum open time during winter months or in any scenario that the end user sees fit. For example, more shading can be used during the summer months so as to keep the house cool, where as minimum shading can be used in the winter months so as to allow for as much sunlight to warm the enclosed area.

Thus, it can be seen that the objects of the invention have been satisfied by the structure and its method for use presented above. While in accordance with the patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A programmable wall station system for controlling automated coverings, comprising:

at least one automated covering adapted to receive command signals;

a computer including a processor and a computer connection port, said processor programmed to:

receive location input;

receive position input for said at least one automated covering;

receive schedule input; and generate a plurality of scheduled events based on any of said received input; and a wall station including a controller and a station connection port that is linkable to said computer connection port, said controller programmed to:

receive said plurality of scheduled events from said processor when said station connection port and said computer connection port are linked to one another; and generate command signals based on said scheduled events when said station connection port and said computer connection port are de-linked from one another and transmitting said command signals which implement said plurality of scheduled events for receipt by said at least one automated covering to control operation thereof.

2. The system according to claim 1, wherein said wall station further comprises:

an up button that upon actuation sends an up command signal to said at least one automated covering;

a down button that upon actuation sends a down command signal to said at least one automated covering; and at least one intermediary position button that upon actuation sends a movement command signal to said at least one automated covering.

3. The system according to claim 2, wherein said wall station further comprises three intermediary buttons whereupon actuation of a first intermediary position button said at least one automated window covering moves to a 25% closed position, whereupon actuation of a second intermediary position button said at least one automated window covering moves to a 50% closed position, and whereupon actuation of a third intermediary position button said at least one automated window covering moves to a 75% closed position.

4. The system according to claim 1, wherein said location input is a postal code.

5. The system according to claim 1, wherein said controller is programmed to:

generate command signals based on said received location input and a day of the year.

6. The system according to claim 1, wherein said processor sets a controller time and date in said controller when said wall station is linked to said computer.

7. The system according to claim 1, wherein said wall station comprises at least one manual user input button which, when actuated, generates a command signal to move said covering to a desired position until a next scheduled event occurs.

8. A method for controlling automated coverings, comprising:

inputting a geographic location for a plurality of automated coverings, positions for said plurality of automated coverings, and a schedule for said plurality of automated coverings into a computer processor which has a computer connection port;

generating an event schedule of a plurality of events for said plurality of automated coverings based on any of said received input entered into said computer processor;

linking said computer processor to a wall station that includes a controller and a station connection port so as to connect said computer connection port to said station connection port and load said event schedule of said plurality of events into said wall station;

de-linking said computer processor from said wall station which maintains said event schedule by disconnecting said computer connection port from said station connection port; and generating and transmitting command signals, which are based on said event schedule by said wall station when de-linked from said computer processor to control positioning of said plurality of automated coverings.

9. The method according to claim 8, further comprising:

actuating one of an up button and a down button on said wall station to move said at least one automated covering.

10. The method according to claim 8, further comprising:

actuating at least one intermediary position button on said wall station to move said at least one automated covering to a designated position.

11. The method according to claim 10, wherein actuation of said intermediary position button moves said at least one covering to a 25%, 50% or 75% closed position.

12. The method according to claim 8, further comprising:

adjusting said event schedule based on said geographic location and a day of year.

13. The method according to claim 8, further comprising:

re-setting a time clock maintained by said wall station during the linking step.

14. The method according to claim 8, further comprising:

linking said wall station to a home automation network and receiving said scheduled events therefrom.

15. The method according to claim 8, further comprising:

uploading said scheduled events from said wall station to another computer processor.

16. The method according to claim 8, comprising:

manually actuating at least one button on said wall station to move said covering to a desired position until an event from said event schedule moves said covering again.

* * * * *